US010476335B2

(12) United States Patent
Limanskiy

(10) Patent No.: US 10,476,335 B2
(45) Date of Patent: Nov. 12, 2019

(54) ELECTRIC MACHINE

(71) Applicant: Valentin Grigoryevich Limanskiy, Moskovskaya oblast (RU)

(72) Inventor: Valentin Grigoryevich Limanskiy, Moskovskaya oblast (RU)

(*) Notice: Subject to any disclaimer, the term of this patent is extended or adjusted under 35 U.S.C. 154(b) by 254 days.

(21) Appl. No.: 15/328,745

(22) PCT Filed: Jun. 29, 2015

(86) PCT No.: PCT/RU2015/000404
§ 371 (c)(1),
(2) Date: Jan. 24, 2017

(87) PCT Pub. No.: WO2016/032364
PCT Pub. Date: Mar. 3, 2016

(65) Prior Publication Data
US 2017/0214285 A1    Jul. 27, 2017

(30) Foreign Application Priority Data
Aug. 25, 2014    (RU) ................... 2014134464

(51) Int. Cl.
*H02K 3/00* (2006.01)
*H02K 3/28* (2006.01)
(Continued)

(52) U.S. Cl.
CPC ............... *H02K 3/28* (2013.01); *H02K 11/33* (2016.01); *H02K 17/165* (2013.01); *H02K 21/14* (2013.01); *H02P 7/06* (2013.01); *H02K 19/20* (2013.01)

(58) Field of Classification Search
CPC ............... H02K 3/00; H02K 3/04; H02K 3/28
See application file for complete search history.

(56) References Cited

U.S. PATENT DOCUMENTS

| | | | |
|---|---|---|---|
| 6,297,575 B1 * | 10/2001 | Yang | H02K 51/00 290/6 |
| 6,455,970 B1 | 9/2002 | Shafer et al. | |
| 7,602,137 B2 * | 10/2009 | Du | H02K 1/278 318/771 |

FOREIGN PATENT DOCUMENTS

| | | |
|---|---|---|
| RU | 2030067 C1 | 2/1995 |
| RU | 2202849 C2 | 4/2003 |
| RU | 2301488 C1 | 6/2007 |

OTHER PUBLICATIONS

International Search Report—PCT/RU2015/000404—dated Nov. 5, 2015.

* cited by examiner

Primary Examiner — Dang D Le
(74) Attorney, Agent, or Firm — Banner & Witcoff, Ltd.

(57) ABSTRACT

The invention belongs to the category of electric motors and power generators, and may expand the area of application, reduce costs, and increase the specific power and efficiency of electric machines. These electric machine comprise a rotor and a stator with winding coils and a control device. Stator winding coils are made as a system of radial and/or tangential coils connected in series and/or back-to-back; each coil has its own electric terminals. The control device connects its electric contacts with terminals of corresponding stator winding coils in order to provide a chain control of electric current supply to the corresponding stator coils and to create, at each point in time, a pre-determined stator magnetic field including a rotating or a reciprocating stator magnetic field, depending on the spatial position and the magnetic condition of the rotor. The invention can be applied to various fields of technology.

7 Claims, 4 Drawing Sheets

(51) Int. Cl.
*H02P 7/06* (2006.01)
*H02K 17/16* (2006.01)
*H02K 21/14* (2006.01)
*H02K 11/33* (2016.01)
*H02K 19/20* (2006.01)

ELECTRIC MACHINE

FIELD OF TECHNOLOGY

The invention described herein belongs to the electric motor and power generator category and may be used to generate electric and/or mechanical energy, to convert electric energy into mechanical energy and vice versa, etc. This electric machine is environmentally friendly and may be used in the power industry, the transport industry, mechanical engineering, the construction industry, astronautics, and other fields of technology.

BACKGROUND ART

Currently, the above tasks are performed partly by commutator and commutatorless machines (M. M. Katsman, *Guide to electric machines* [Moscow: Academy, 2005, ISBN 5-7695-1686-0], p. 9). Commutator machines include universal electric machines and direct current machines, for example, those with permanent magnets and excitation winding. Commutatorless machines include synchronous and asynchronous electric machines, for example, those with squirrel-cage and phase-wound rotor, single-phase, three-phase, capacitor-type, reactive, hysteresis-type, linear and brushless rotor.

Among the above-mentioned machines, the most similar to the proposed machine are the brushless motors (see ibid., pp. 313-317) that include a rotor and a stator with their coils (phases) connected in parallel and have a thyristor (controlled) current feed to stator coils.

Phase machines (including brushless ones) are based on a relatively simple principle of operation: at first, maximum electric current is supplied to the first phase (a coil, or a system of coils), which makes the rotor turn by a certain angle. Then, similarly, maximum electric current is supplied to the second phase (a coil, or a system of coils). The rotor turns by a certain angle again, etc. Of course, electric current in the previous phase[s] (coil[s]) must be changed, for example, decreased; otherwise, the rotor will stop turning. Evidently, such a design does function, but is not optimal: not all the coils operate at full capacity at any moment.

Therefore, one must discontinue using such imperfect electric machines and use two-wire (single-phase, mostly direct) electric current only, with a full load of all winding coils (alternating electrical current has a large anti-induction and its power is smaller by a square root of two).

SUMMARY OF THE INVENTION

The purpose of the invention described herein is to create a high-performance, convenient-to-operate and environmentally friendly device with high efficiency and specific power to generate electric and/or mechanical energy, to convert electric energy into mechanical energy and vice versa, etc. Thus, the objective of the invention is to expand the area of application, to reduce costs and to increase the specific power and efficiency of the electric machines. Depending on the application, this electric machine may be used as an electric motor, a power generator, an electric motor-generator; in particular, it may be used as an electric DC transformer, wherein an electric motor fed by an alternating electric current rotates an electric generator that feeds direct electric current into an external two-wire grid (or vice versa).

The previously mentioned objective is solved by means of an electric machine that comprises a rotor and a stator with stator winding coils and a control device. The stator winding coils are made as a system of radial and/or tangential coils connected in series and/or back-to-back; each of the coils have terminals, and the control device can connect its electric contacts to the terminals of the corresponding coils in order to provide a chain control of electric current supply to the corresponding stator coils and thus to create, at each point in time, a pre-determined stator magnetic field in the electric machine, whether a rotating, or a reciprocating one, depending on the spatial position and the magnetic condition of the rotor that performs rotating, or reciprocating motions.

It is obvious that two coils can be connected in series (with identical orientation of their turns), back-to-back (with an inverted orientation of their winding coils) and, similarly, in parallel and antiparallel.

Definition 1. A chain is a multitude of stator coils connected to one another in some manner, including by means of a control device.

Definition 2. Chain control is control by means of a control device, when connects to the chain, as it exists at any particular moment (herewith the chain consists of two or more stator coils connected in series and/or back-to-back and each of the coils have electric current of a predetermined direction): 1) one, or more radial stator coils, or 2) if required, one or more tangential stator coils, or 3) if required, two, or more tangential and radial stator coils, 4) while other stator coil(s) may be simultaneously disconnected from this chain. Moreover, each of the coils so connected to the control device (including through other stator coils at a particular moment) must have electric terminals (contacts) to enable its connection to (disconnection from) the previously mentioned chain by means of the control device. Therefore, chain control may arrange a corresponding motion of the stator magnetic field by controlling the electric current feed into the corresponding stator coils. The above definition of chain control involves the properties of a control device which are not considered herein; average existing technology allows creating such devices with such properties.

Novelty of the Device

With a sufficient number of stator coils, one may use the control device to achieve specific changes of the stator magnetic field (for example, achieve a rotation of the stator magnetic field) and make the magnetized rotor core perform a required motion (for example, revolve about its axis). In particular, the stator magnetic field can be rotated depending on the spatial position and the magnetic condition of the rotor that performs rotating (see ibid., pp. 313-314), or reciprocating motions. By generating, at each point in time, a predetermined (corresponding) stator magnetic field in an electric machine (thus making the rotor perform a predetermined motion), control systems may manage the operation of machinery, gear, vehicles, etc. (see ibid., pp. 5-6, 369-370, 389). Therefore, chain control opens a very broad range of rotor motion control possibilities in an electric machine, such as: rotating (including with variable frequency), reciprocating (including with variable frequency), frequent starts and stops, intermittent motion, back-and-forth rotation, retention of the rotor at a given angular direction, etc. Thus, the electric machine described herein is multifunctional and can be designed in different variations.

If the proposed device is used as an electric motor, it shall have the following distinct features: firstly, an enhanced concentration of the magnetic flux of the stator core (due to the radial width of the stator core) in the rotor of the electric machine; secondly, a lower energy consumption to perform the rotation of the stator magnetic field (as the stator coils switched at each point in time are relatively small); and thirdly, a significant relative decrease in anti-induction in the stator winding because the length of the stator magnetic line (excited by the rotor in the stator core) exceeds the length of the rotor magnetic line (excited by the stator in the rotor core).

If the proposed device is used as an electric generator, it shall have a significant relative increase of induction in the stator winding, for example, due to the use of a rotor with two beveled poles, which reduces the energy consumed to rotate the rotor. For example, in those rotor points where magnetic force lines of the rotor and the stator are approximately parallel, there is no significant deceleration of the rotor which can be rotated, for example, by an electric motor (an important system consisting of two interacting electric units: electric motor and electric generator shall hereinafter be referred to as electric motor-generator). Thus, the proposed electric machine has asymmetric magnetic interaction of the rotor and the stator.

With a sufficient number of controlled stator winding coils in the nominal state in the important examples of the device, the rotor operates at almost a constant torque since, during the rotation of the rotor and the stator magnetic field, the relative orientation of their magnetic force lines is maintained with sufficient accuracy.

If electric current is fed to all stator winding coils simultaneously, a stronger, more uniform, and more extended stator magnetic field emerges in the rotor, as compared to the stator magnetic field in commutator, commutatorless and brushless machines, for example.

The previously mentioned novelty of the device achieves a significant increase of specific power and efficiency of the electric machine and enables it to have a wide range of applications in the economy.

In specific cases (which nor restrict the entire scope of claims of this engineering solution, but serve for illustration of particular applications only), this electric machine can be made as:
1) a DC electric motor, or DC power generator whose rotor consists of a two-magnetic-pole core (core with two magnetic poles) or a short-circuited (squirrel-cage) core, or a magnetically soft core with two segments cut in parallel, and the stator contains a magnetically soft core and tangential and/or radial stator winding coils connected in series and their electric terminals, whereas the control device can connect its electric contacts to the stator coil terminals in order to create, at each point in time, a pre-determined stator magnetic field in the electric machine, depending on the rotor's position (DC electric motor—electric motor of a direct electric current, DC power generator—electric generator of a direct electric current);
2) a DC power generator whose rotor consists of two magnetic beveled poles, and the stator contains tangential and/or radial stator winding coils connected in series and their electric terminals, whereas the control device can connect its electric contacts to the stator coil terminals to create, at each point in time, a pre-determined stator magnetic field in the electric machine, depending on the rotor's position;
3) an AC power generator whose rotor consists of two magnetic poles, and the stator has a magnetically soft core and two equal-sized tangential stator coils connected in series, or back-to-back, and their electric terminals for connection to an external two-wire electric grid; if these two stator coils are connected in series, the two electric terminals are located in the opposite parts of the stator winding, and if connected back-to-back, these two electric terminals are located next to each other (AC power generator—electric generator of an alternating electric current).

Examples of electric machines described in points 1 & 2 are DC electric machines. However, if necessary, such machines may also operate in AC mode if the current is supplied to the stator and the rotor windings simultaneously.

A control device is a special device that controls the supply of electric current to the stator winding and/or the rotor winding to generate a predetermined specified stator magnetic field, including a rotating one, and/or a predetermined magnetic condition of the rotor.

Usually, control devices are either mechanical (commutators) or electronic.

Thus, in the simplest case, the control device connects the external electric two-wire grid (connected to the two electric contacts of the control device), at each moment in time, for example, to two diametrically opposed points of the stator winding (whose coils are connected in series). By means of the control device, the said two points of electric contact are consecutively moved with time along the electric terminals of the stator winding coils; this achieves a rotation of the stator magnetic field and thus, a rotation of the magnetized rotor core around its axis.

Depending on the application of the device, a change of the stator magnetic field may: 1) depend on the spatial position of the rotor; 2) be independent of it; 3) be mixed, that is, be dependent on the spatial position of the rotor and be independent of it at different times. Thus, the control device connects the external two-wire grid consecutively to the corresponding electrical terminals (contacts) of the stator and/or rotor coils.

Furthermore, a more sophisticated control device may have a greater number of simultaneously active electric terminals generating a more complex magnetic field in the stator windings, including a rotating multipolar stator magnetic field. It will interact with the rotor and move it.

In this electric machine, the rotor core may be a permanent magnet, or an electromagnet; it may be a multi-pole (in particular, it may have two magnetic beveled poles) or may be designed with several squirrel-cage turns (a squirrel-cage rotor) or made of magnetically soft steel with two cut-off segments, or made of magnetically soft steel with permanent magnets inserted in bores thus making the rotor core a whole a permanent magnet, etc.

BRIEF DESCRIPTION OF THE FIGURES

Examples of magnetic systems of the electric machines described in Points 2-4 of the Claims section are shown, in static mode, in FIGS. 1-4, respectively.

IMPLEMENTATION EXAMPLES

Example 1

Figure 1:
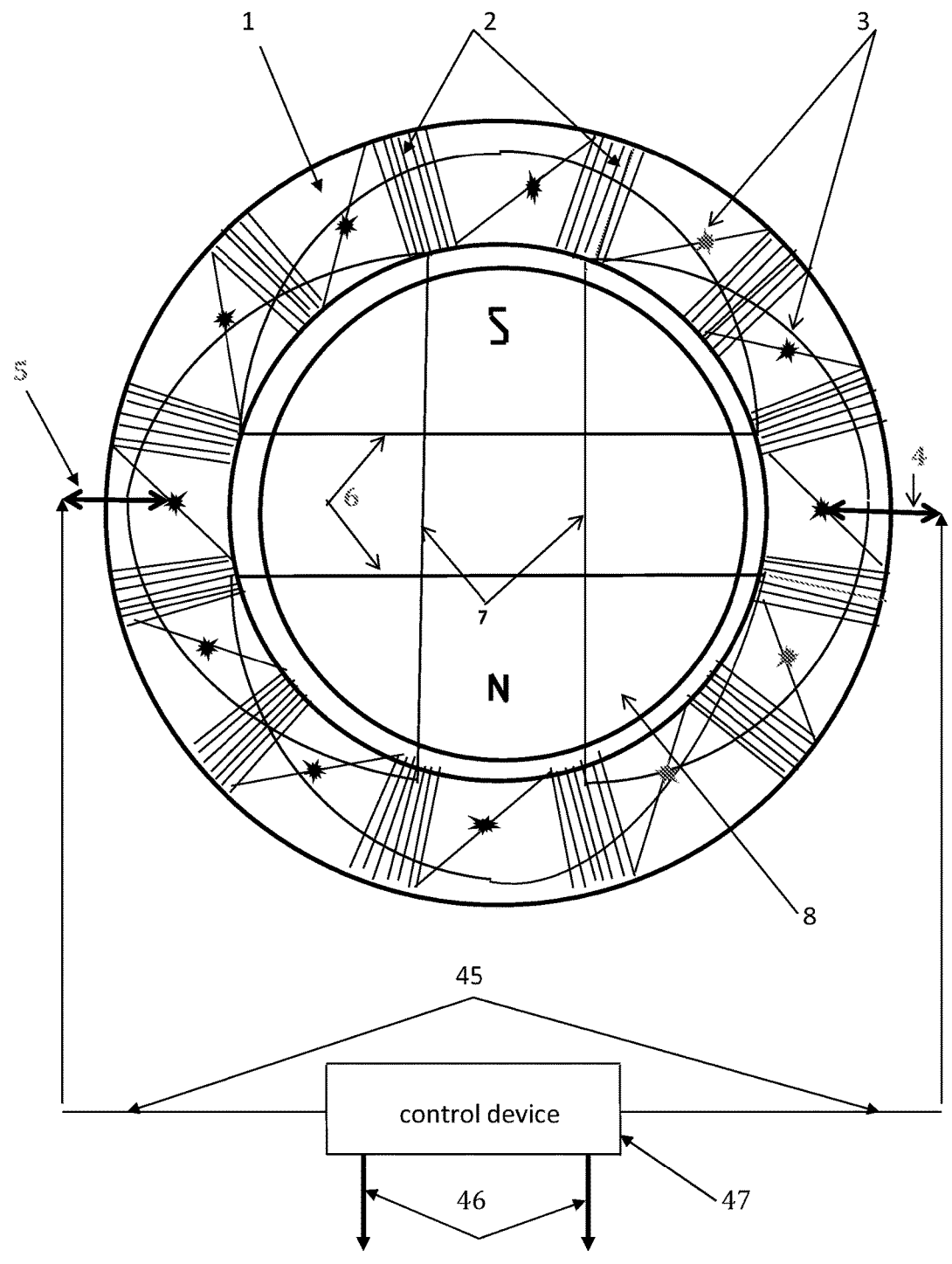

FIG. 1 depicts an end view of the magnetic system of a DC electric motor, or DC power generator which consists of the magnetically soft core of the stator (1) with tangential, connected in series stator winding coils (2), their electrical terminals (3), and a control device (47) with terminals/wires (45), which, at each point in time connects an external two-wire grid (46), via electric contacts (4) and (5), with the specified, connected in series, tangential coils (2) of the stator winding. At subsequent times, the control device selects new terminal/wires that connect the external two-wire grid with new contacts of the stator coil. In this case, force lines (6) and (7) of the magnetic field of the stator (1) and the rotor (8) penetrate the core of a two-pole rotor (8) and have an almost stable relative orientation during the rotation of the rotor (8) (approximately mutually perpendicular), which ensures a torque stability of the rotor (8) under a steady load.

In this electric machine, the rotor core may be a permanent magnet or an electromagnet; it may be a multi-pole (in particular, it may have two magnetic beveled poles) or may be designed with several squirrel-cage turns (a squirrel-cage rotor), or made of magnetically soft steel with two cut-off segments, or made of magnetically soft steel with permanent magnets inserted in bores thus making the core of the rotor (8) a whole a permanent magnet, etc. In this example, the rotor (8) is positioned relative to the stator (1) in such a manner as to enable a maximum momentum of the rotor (8) in the nominal state. Since the tangential coils (2) of the stator (1), located next to electric contacts (4) and (5), do not contribute significantly to the magnetic field of the stator (1) (which interacts with the rotor (8)), the control device may disable them when generating the magnetic field. However, if these coils are dimensionally insignificant, this complication is not required.

Definition 3. Any coil (2) coiled around the core of the stator (1) with tangential arrangement of its axis shall hereinafter be referred to as tangential coil, or tangential stator winding coil.

Example 2

Figure 2:
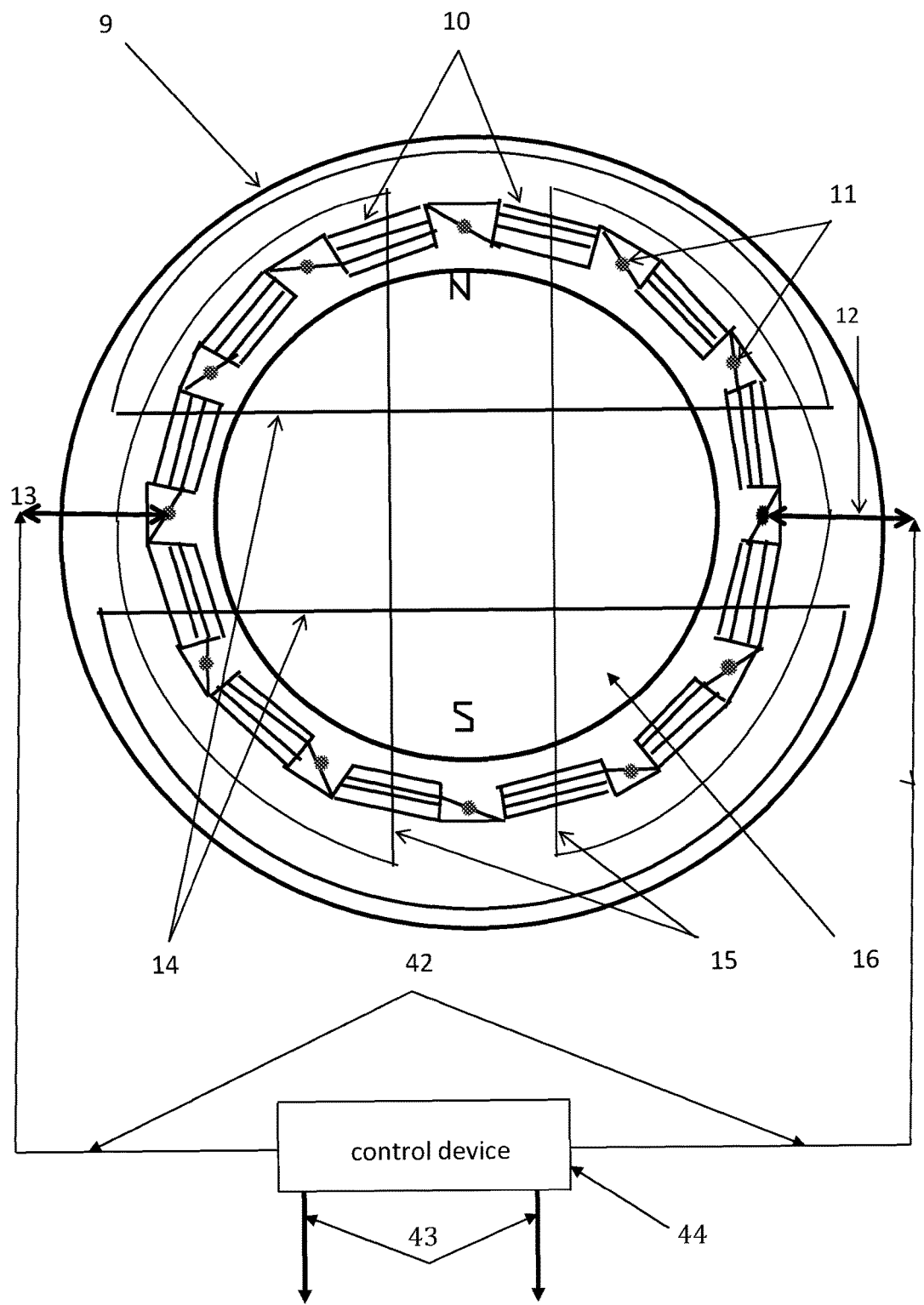

FIG. 2 shows an end view of the magnetic system of a DC electric motor, or DC electric generator, which consists of the magnetically soft core of the stator (9) with radial, connected in series stator winding coils (10), their electrical terminals—contacts (11), and a control device (44) with terminals/wires (42), which at any point in time connects an external two-wire grid (46) via electric contacts (12) and (13), with the specified, radial stator coils (10) connected in series. At subsequent times, the control device selects new terminal/wires that connect the external two-wire grid with new contacts of the stator coil. In this case, power lines (14) and (15) of the magnetic field of the stator (9) and the rotor (16) penetrate the core of a double-pole rotor (16) and have an almost stable relative orientation during the rotation of the rotor (16) (approximately mutually perpendicular), which ensures a torque stability of the rotor (16) under a steady load.

In this electric machine, the rotor core may be a permanent magnet or an electromagnet; it may be a multi-pole (in particular, it may have two magnetic beveled poles) or may be designed with several squirrel-cage turns (a squirrel-cage rotor) or made of magnetically soft steel with two cut-off segments, or made of magnetically soft steel with permanent magnets inserted in bores, thus making the core of the rotor (16) a whole a permanent magnet, etc. In this example, the rotor (16) is positioned relative to the stator (9) so that the rotor (16) has a maximum torque.

Definition 4. Any stator winding coil (10) coiled around the core of the stator (9) with radial arrangement of its axis shall hereinafter be referred to as a radial coil or a radial stator winding coil.

Example 3

Figure 3:
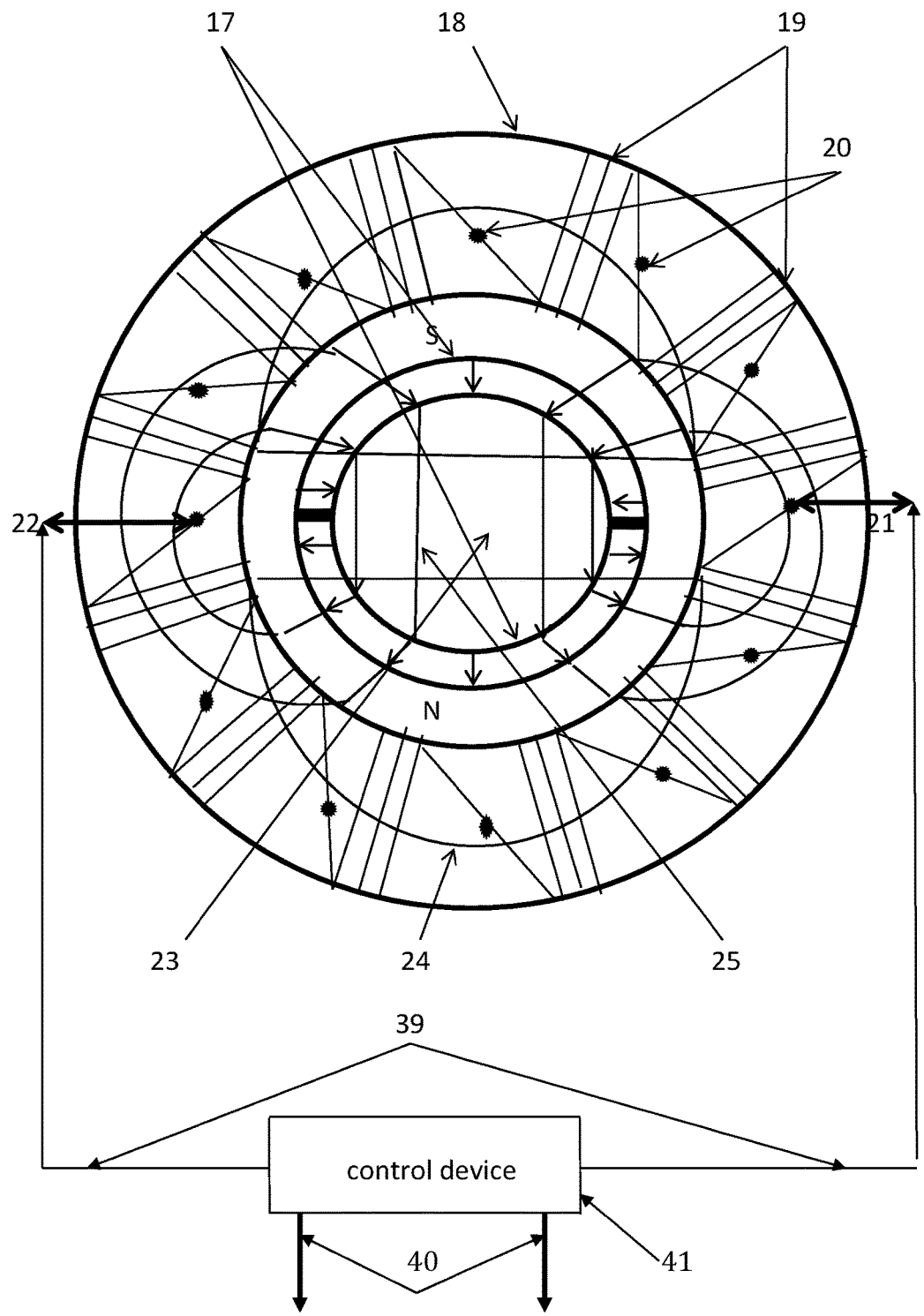

FIG. 3 shows an end view of the magnetic system of a DC power generator which consists of a rotor (17) with two beveled poles and a magnetically soft core of the stator (18) with tangential, connected in series to stator winding coils (19) and their electric terminals (contacts) (20) connected with the corresponding electric contacts (21) and (22) with terminals/wires (39) of a control device (41), which, in turn, at any point in time directs the induction electric current produced in the stator coils to the terminals of an external two-wire grid (40). At subsequent times, the control device selects new terminal/wires that connect the external two-wire grid with new contacts of the stator coil. The internal part of the rotor (23) is made of a nonmagnetic material. Lines (24) and (25) are magnetic lines of the stator (18) and the rotor (17), respectively.

Definition 5. The two-pole rotor shown in FIG. 3, which consists of a hollow cylinder with two equal-sized magnets located in it and which has an oblique (beveled), for example, radial, magnetic field direction, shall hereinafter be referred to as a rotor with two beveled poles. Thus, the rotor (17) with nonmagnetic material in the cylinder cavity that contains the previously mentioned oblique (beveled) magnets shall be referred to as a rotor with two beveled poles.

Example 4

Figure 4:
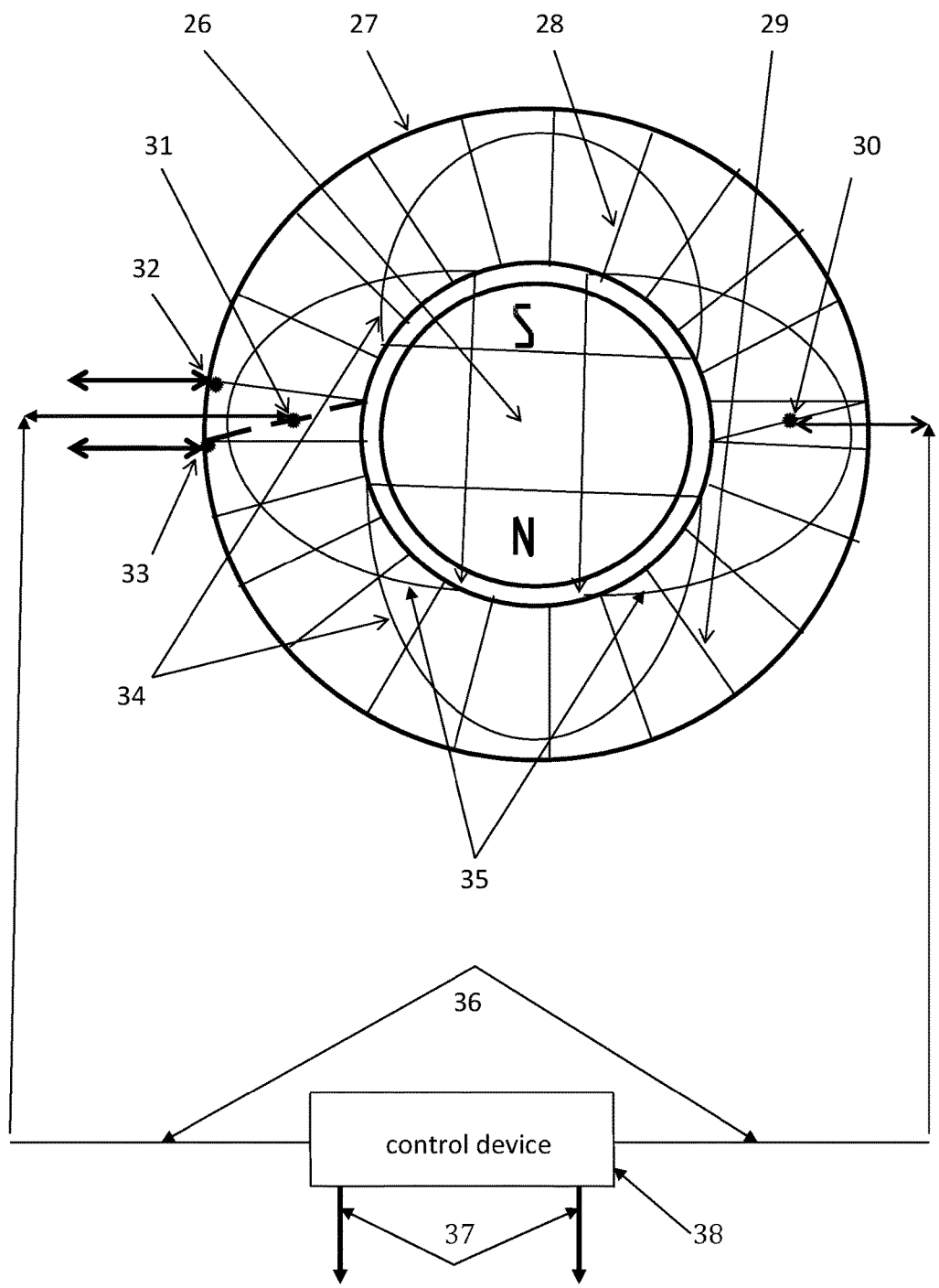

FIG. 4 shows an end view of the magnetic system of an AC power generator which consists of a two-pole rotor (26) and magnetically soft core of the stator (27) that has two equal-sized tangential stator coils (28) and (29) connected in series or back-to-back, whose two stationary electric terminals (contacts) (30) and (31) (or (32) and (33)) are connected to the external two-wire grid (37) and are located, correspondingly, either on the opposite parts of the winding of the stator 27 (if the two stator winding coils (28) and (29) are connected in series), or next to each other (if the two stator winding coils (28) and (29) are connected back-to-back, in which case the dotted link between these two coils is absent). In this example, lines (34) of the magnetic field of the stator (27) do not rotate; lines (35) of the rotor rotate together with the rotor (26) and inductively generate alternating current in the coils (28) and (29) of the stator (27); the current is supplied to the external two-wire grid (37) via a control device (38) with terminals (36).

Moreover, the electric machine may have a reciprocating motion of the rotor and, accordingly, the stator magnetic field (not shown in figures). As we know, a two-pole magnet (of the rotor) can be retracted (or pushed) into the stator winding coil or a system of coils that has an electric current. If a rotor with two magnetic poles moves in a reciprocating mode, chain control may arrange a corresponding motion of the stator magnetic field by controlling the electric current feed into the corresponding stator coils. Obviously, there may be more than one such magnet with two poles located along the stator at a certain distance from one another and forming to the rotor magnetic system.

Specific examples 1-4 (see FIGS. 1-4) of various electric machines operating as follows.

In Example 1, the DC electric machine shown in FIG. 1 can function as an electric motor and as a power generator (if rotor (8) is magnetized). If it is used as an electric motor, it needs to receive DC current from an external two-wire grid (through a control device). If the electric machine is used as a power generator, it will feed DC current to an external two-wire grid. In the device as shown in the figure, electric contacts of coils (2) of the stator (1) are connected with the corresponding electric contacts (45) of the control device in order to generate a rotating magnetic field of the stator (1) depending on the position of the rotor (8).

Of course, the rotation speed of the stator magnetic field may be maintained and changed arbitrarily, as required. In such cases, the rotation of the rotor (8), if not overloaded, will follow the rotation of the magnetic field of the stator (1). If the device is used as an electric motor, the coils of the stator (1) and rotor 8 may be powered simultaneously, either with a direct current or an alternating one.

In Example 2, the DC electric machine shown in FIG. 2 can function either as an electric motor, or as a power generator. If it is used as an electric motor, it needs to receive DC current from an external two-wire grid (through a control device). If the electric machine is used as a power generator, it will feed DC current to an external two-wire grid. In the device as shown in the figure, electric contacts (11) of the stator coils (10) are connected to the corresponding electric contacts (42) of the control device in order to generate a rotating magnetic field of the stator (9) depending on the position of the rotor (16).

In Example 3 (see FIG. 3), the electric machine is a DC power generator. As soon as the rotor with two beveled poles (17) is rotated by an external force, a voltage appears at the electric contacts on the external two-wire grid (40); this voltage may be used to obtain direct current in this grid. It should be emphasized that a rotor with two beveled poles is used to reduce the energy consumption required for the rotor rotation, and therefore, to achieve a significant increase in efficiency of the DC power generator described herein.

In Example 4 (see FIG. 4), the electric machine is an AC power generator. As soon as the rotor (26) is rotated by an external force, an alternating voltage appears at the two stationary electric terminals (30) and (31) (or (32) and (33)) of the winding of the stator (27) connected to an external two-wire grid; this voltage may be used to obtain alternating current in this grid. This current arises as a result of electric current induced with a given direction in the two coils of the stator winding; the resulting utility is electric current in the external two-wire grid (37).

INDUSTRIAL APPLICABILITY

At present, an experimental model of this electric machine has been made; it can be used as an electric motor or a DC power generator. Modern technology allows setting up mass production of such innovative electric machines, whether low-capacity, average-capacity, or high-capacity.

The invention claimed is:

1. An electric machine comprising:
a rotor configured to perform rotating or reciprocating motions;
a stator comprising stator winding coils; and
a control device comprising electrical contacts, wherein:
the stator winding coils are made as a system of radial and/or, tangential coils connected in series and/or back-to-back,
each of the stator winding coils comprises terminals, and the control device is configured to connect the electrical contacts to the terminals of corresponding ones of the stator winding coils in order to provide a chain control of electric current supply to the corresponding stator winding coils and to create, at each of a plurality of points in time, a pre-determined stator magnetic field in the electric machine, depending on a spatial position and a magnetic condition of the rotor that performs the rotating or reciprocating motions.

2. The electric machine of claim 1, wherein the electric machine is configured to function either as a direct current (DC) electric motor or a DC power generator, wherein the rotor comprises a two-magnetic-pole core, a short-circuited (squirrel-cage) core, or a magnetically soft core with two segments cut in parallel, wherein the stator comprises a magnetically soft core, wherein the stator winding coils are tangential and/or radial stator winding coils connected in series at their terminals, and wherein the control device is configured to connect the electrical contacts to the terminals of the stator winding coils in order to create, at each of the plurality of points in time, a rotating stator magnetic field in the electric machine depending on the rotor's position.

3. The electric machine of claim 1, wherein the electric machine is configured to function as a direct current (DC) power generator, wherein the rotor comprises two magnetic beveled poles, wherein the stator winding coils comprise tangential and/or radial stator winding coils connected in series at their terminals, and wherein the control device is configured to connect the electrical contacts to the terminals of the stator winding coils in order to create, at each of the plurality of points in time, a rotating stator magnetic field in the electric machine depending on the rotor's position.

4. The electric machine of claim 1, wherein the electric machine is configured to function as an alternating current (AC) power generator, wherein the rotor comprises two magnetic poles, wherein the stator comprises a magnetically soft core and two equal-sized tangential stator coils, and wherein the terminals of the two equal-sized tangential stator coils are configured to connect to an external two-wire electric grid using the control device.

5. The electric machine of claim 4, wherein the two equal-sized tangential stator coils are connected in series, and wherein the two terminals of the two equal-sized tangential stator coils are located at opposite portions of one of the stator.

6. The electric machine of claim 4, wherein the two equal-sized tangential stator coils are connected back-to-back, and wherein the two terminals of the two equal-sized tangential stator coils are located next to each other.

7. The electric machine of claim 1, wherein the electric machine is a single-phase electric machine and the terminals are configured to connect to an external two-wire electric grid.

* * * * *